(12) United States Patent
Anderson

(10) Patent No.: US 8,958,293 B1
(45) Date of Patent: Feb. 17, 2015

(54) TRANSPARENT LOAD-BALANCING FOR CLOUD COMPUTING SERVICES

(75) Inventor: Evan K. Anderson, Seattle, WA (US)

(73) Assignee: Google Inc., Mountain View, CA (US)

( * ) Notice: Subject to any disclaimer, the term of this patent is extended or adjusted under 35 U.S.C. 154(b) by 187 days.

(21) Appl. No.: 13/312,872

(22) Filed: Dec. 6, 2011

(51) Int. Cl.
*H04W 36/22* (2009.01)

(52) U.S. Cl.
USPC .......................................... 370/230

(58) Field of Classification Search
USPC ................. 370/230, 229, 235, 254
See application file for complete search history.

(56) References Cited

U.S. PATENT DOCUMENTS

| | | |
|---|---|---|
| 5,463,768 A | 10/1995 | Cudihy et al. |
| 5,655,081 A | 8/1997 | Bonnell et al. |
| 5,778,444 A | 7/1998 | Langan et al. |
| 5,794,224 A | 8/1998 | Yufik |
| 6,148,368 A | 11/2000 | DeKoning |
| 6,178,482 B1 | 1/2001 | Sollars |
| 6,449,671 B1 | 9/2002 | Patkar et al. |
| 6,490,651 B1 | 12/2002 | Shats |
| 6,505,211 B1 | 1/2003 | Dessloch et al. |
| 6,505,248 B1 | 1/2003 | Casper et al. |
| 6,587,866 B1 | 7/2003 | Modi et al. |
| 6,598,179 B1 | 7/2003 | Chirashnya et al. |
| 6,643,613 B2 | 11/2003 | McGee et al. |
| 6,829,678 B1 | 12/2004 | Sawdon et al. |
| 6,891,839 B2 | 5/2005 | Albert et al. |
| 6,898,697 B1 | 5/2005 | Gao et al. |
| 6,996,502 B2 | 2/2006 | De La Cruz et al. |
| 7,043,455 B1 | 5/2006 | Cuomo et al. |
| 7,062,718 B2 | 6/2006 | Kodosky et al. |
| 7,117,243 B2 | 10/2006 | Peart |
| 7,356,679 B1 | 4/2008 | Le et al. |
| 7,466,703 B1 * | 12/2008 | Arunachalam et al. ....... 370/392 |
| 7,478,388 B1 | 1/2009 | Chen et al. |
| 7,500,262 B1 | 3/2009 | Sanin et al. |

(Continued)

FOREIGN PATENT DOCUMENTS

| | | |
|---|---|---|
| EP | 1 130 845 | 9/2001 |
| EP | 1 253 766 | 12/2005 |
| WO | WO 2011/095516 | 8/2011 |

OTHER PUBLICATIONS

Farinacci et al., "RFC 2784: Generic Routing Encapsulation (GRE)", Mar. 2000, The Internet Society, 10 pages.

(Continued)

*Primary Examiner* — Andrew Lai
*Assistant Examiner* — Zhiren Qin
(74) *Attorney, Agent, or Firm* — Fish & Richardson P.C.

(57) ABSTRACT

Systems and techniques are described for virtual machine (VM) load-balancing. A described technique includes running VMs that communicate via a virtual network, the VMs being configured to handle requests associated with at least a destination address on a public network and operating gateways that provide connectivity between the virtual network and the public network, and use a consistent mapping operation to perform load-balancing among the VMs. A gateway can obtain VM health information; determine based on the VM health information a group of healthy VMs; receive an incoming packet that includes a source address and the destination address; select a handling VM based on an output of the consistent mapping operation given the source address and the group of healthy VMs; forward the incoming packet to the handling VM via the virtual network; and create an entry to forward one or more additional incoming packets to the handling VM.

16 Claims, 9 Drawing Sheets

(56) References Cited

U.S. PATENT DOCUMENTS

| | | |
|---|---|---|
| 7,529,836 B1 | 5/2009 | Bolen et al. |
| 7,584,467 B2 | 9/2009 | Wickham et al. |
| 7,596,620 B1 | 9/2009 | Colton et al. |
| 7,650,331 B1 | 1/2010 | Dean et al. |
| 7,653,833 B1 | 1/2010 | Miller et al. |
| 7,761,573 B2 | 7/2010 | Travostino et al. |
| 7,804,862 B1 | 9/2010 | Olson et al. |
| 7,836,285 B2 | 11/2010 | Giri et al. |
| 8,051,414 B2 | 11/2011 | Stender et al. |
| 8,065,717 B2 | 11/2011 | Band |
| 8,103,771 B2 | 1/2012 | Tanaka et al. |
| 8,108,903 B2 | 1/2012 | Norefors et al. |
| 8,127,295 B1 | 2/2012 | Jones et al. |
| 8,146,147 B2 | 3/2012 | Litvin et al. |
| 8,219,777 B2 | 7/2012 | Jacobson et al. |
| 8,261,295 B1 | 9/2012 | Risbood et al. |
| 8,276,140 B1 | 9/2012 | Beda, III et al. |
| 8,296,459 B1 | 10/2012 | Brandwine et al. |
| 8,407,687 B2 | 3/2013 | Moshir et al. |
| 8,423,993 B2 | 4/2013 | Faus et al. |
| 8,468,535 B1 | 6/2013 | Keagy et al. |
| 8,484,353 B1 | 7/2013 | Johnson et al. |
| 8,504,844 B2 | 8/2013 | Browning |
| 8,533,796 B1 | 9/2013 | Shenoy et al. |
| 2002/0091902 A1 | 7/2002 | Hirofuji |
| 2002/0097747 A1 | 7/2002 | Kirkby |
| 2004/0068637 A1 | 4/2004 | Nelson et al. |
| 2004/0139368 A1 | 7/2004 | Austen et al. |
| 2004/0148484 A1 | 7/2004 | Watanabe et al. |
| 2004/0210653 A1 | 10/2004 | Kanoor et al. |
| 2005/0010715 A1 | 1/2005 | Davies et al. |
| 2005/0166011 A1 | 7/2005 | Burnett et al. |
| 2005/0196030 A1 | 9/2005 | Schofield et al. |
| 2005/0216659 A1 | 9/2005 | Ogawa et al. |
| 2005/0237543 A1 | 10/2005 | Kikuchi |
| 2005/0289499 A1 | 12/2005 | Ogawa et al. |
| 2006/0026354 A1 | 2/2006 | Lesot et al. |
| 2006/0048077 A1 | 3/2006 | Boyles |
| 2006/0048130 A1 | 3/2006 | Napier et al. |
| 2006/0059228 A1 | 3/2006 | Kasamsetty et al. |
| 2006/0067236 A1 | 3/2006 | Gupta |
| 2006/0075199 A1 | 4/2006 | Kallahalla et al. |
| 2006/0098618 A1* | 5/2006 | Bouffioux ............... 370/349 |
| 2006/0136676 A1 | 6/2006 | Park et al. |
| 2006/0153099 A1 | 7/2006 | Feldman |
| 2006/0161753 A1 | 7/2006 | Aschoff et al. |
| 2006/0271547 A1 | 11/2006 | Chen et al. |
| 2007/0011361 A1 | 1/2007 | Okada et al. |
| 2007/0112956 A1 | 5/2007 | Chapman et al. |
| 2007/0118694 A1 | 5/2007 | Watanabe et al. |
| 2007/0123276 A1* | 5/2007 | Parker et al. ............ 455/461 |
| 2007/0177198 A1* | 8/2007 | Miyata ................... 358/1.15 |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2007/0288921 A1 | 12/2007 | King et al. |
| 2008/0028389 A1 | 1/2008 | Genty et al. |
| 2008/0086515 A1 | 4/2008 | Bai et al. |
| 2008/0095176 A1 | 4/2008 | Ong et al. |
| 2008/0107112 A1 | 5/2008 | Kuo et al. |
| 2008/0205415 A1 | 8/2008 | Morales |
| 2008/0208681 A1 | 8/2008 | Hammad et al. |
| 2008/0215796 A1 | 9/2008 | Lam et al. |
| 2008/0222246 A1 | 9/2008 | Ebling et al. |
| 2008/0222375 A1 | 9/2008 | Kotsovinos et al. |
| 2008/0244030 A1 | 10/2008 | Leitheiser |
| 2008/0244471 A1 | 10/2008 | Killian et al. |
| 2008/0250407 A1 | 10/2008 | Dadhia et al. |
| 2008/0270704 A1 | 10/2008 | He et al. |
| 2008/0304516 A1 | 12/2008 | Feng et al. |
| 2008/0307258 A1 | 12/2008 | Challenger et al. |
| 2008/0313241 A1 | 12/2008 | Li et al. |
| 2009/0097657 A1 | 4/2009 | Schiedt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0235358 A1 | 9/2009 | Tolba |
| 2009/0240744 A1 | 9/2009 | Thomson |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0282266 A1 | 11/2009 | Fries et al. |
| 2009/0300605 A1 | 12/2009 | Edwards et al. |
| 2009/0300641 A1 | 12/2009 | Friedman et al. |
| 2009/0310554 A1 | 12/2009 | Sun et al. |
| 2010/0017859 A1 | 1/2010 | Kelly |
| 2010/0023582 A1 | 1/2010 | Pedersen et al. |
| 2010/0046426 A1 | 2/2010 | Shenoy et al. |
| 2010/0057913 A1 | 3/2010 | DeHaan |
| 2010/0071035 A1 | 3/2010 | Budko et al. |
| 2010/0094999 A1 | 4/2010 | Rama et al. |
| 2010/0095000 A1 | 4/2010 | Kettler et al. |
| 2010/0199089 A1 | 8/2010 | Vysogorets et al. |
| 2010/0215050 A1* | 8/2010 | Kanada .................... 370/401 |
| 2010/0217927 A1 | 8/2010 | Song |
| 2010/0235649 A1 | 9/2010 | Jeffries et al. |
| 2010/0274984 A1 | 10/2010 | Inomata et al. |
| 2010/0287548 A1 | 11/2010 | Zhou et al. |
| 2010/0293285 A1 | 11/2010 | Oishi et al. |
| 2010/0303241 A1 | 12/2010 | Breyel |
| 2011/0010483 A1 | 1/2011 | Liljeberg |
| 2011/0022812 A1 | 1/2011 | van der Linden et al. |
| 2011/0055361 A1 | 3/2011 | DeHaan |
| 2011/0060882 A1 | 3/2011 | Efstathopoulos |
| 2011/0078363 A1 | 3/2011 | Yeh et al. |
| 2011/0085563 A1 | 4/2011 | Kotha et al. |
| 2011/0103389 A1 | 5/2011 | Kidambi et al. |
| 2011/0153697 A1 | 6/2011 | Nickolov et al. |
| 2011/0153838 A1 | 6/2011 | Belkine et al. |
| 2011/0179412 A1 | 7/2011 | Nakae et al. |
| 2011/0191485 A1 | 8/2011 | Umbehocker |
| 2011/0191768 A1 | 8/2011 | Smith |
| 2011/0197024 A1 | 8/2011 | Thomas |
| 2011/0231280 A1 | 9/2011 | Farah |
| 2011/0246767 A1 | 10/2011 | Chaturvedi et al. |
| 2011/0258441 A1 | 10/2011 | Ashok et al. |
| 2011/0296157 A1 | 12/2011 | Konetski et al. |
| 2011/0302400 A1 | 12/2011 | Maino et al. |
| 2011/0302415 A1 | 12/2011 | Ahmad et al. |
| 2012/0060018 A1 | 3/2012 | Shinde et al. |
| 2012/0063458 A1 | 3/2012 | Klink et al. |
| 2012/0084570 A1 | 4/2012 | Kuzin et al. |
| 2012/0084768 A1 | 4/2012 | Ashok et al. |
| 2012/0089981 A1 | 4/2012 | Tripathi et al. |
| 2012/0159634 A1 | 6/2012 | Haikney et al. |
| 2012/0173866 A1 | 7/2012 | Ashok et al. |
| 2012/0179796 A1 | 7/2012 | Nagaraj et al. |
| 2012/0185688 A1 | 7/2012 | Thornton et al. |
| 2012/0191912 A1 | 7/2012 | Kadatch et al. |
| 2012/0233678 A1 | 9/2012 | Pal |
| 2012/0233705 A1 | 9/2012 | Boysen et al. |
| 2012/0246637 A1* | 9/2012 | Kreeger et al. ................ 718/1 |
| 2012/0266159 A1 | 10/2012 | Risbood et al. |
| 2013/0047151 A1* | 2/2013 | Sridharan et al. .............. 718/1 |
| 2013/0074181 A1 | 3/2013 | Singh |
| 2013/0081014 A1 | 3/2013 | Kadatch et al. |
| 2013/0117801 A1 | 5/2013 | Shieh et al. |
| 2013/0212709 A1 | 8/2013 | Tucker |
| 2013/0227303 A1 | 8/2013 | Kadatch et al. |
| 2013/0276068 A1 | 10/2013 | Alwar |

OTHER PUBLICATIONS

Kent et al., "RFC 4301: Security Architecture for the Internet Protocol", Dec. 2005, The Internet Society, 102 pages.

Moller, Jan, et al., "Internal Network Security", Feb. 1, 2000-May 18, 2001, Retrieved from the Internet: <URL: http://www.daimi.au.dk/~fwiffo/thesis/>, 183 pages.

Primet, Pascale, et al.., "HIPCAL: State of the Art of OS and Network virtualization solutions for Grids", Sep. 14, 2007, 38 pages.

Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.

(56) References Cited

OTHER PUBLICATIONS

Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.

Bucket Explorer. "What is my AWS Access and Secret Key." [Retrieved Apr. 26, 2011]. Retrieved from the Internet <URL: http://www.bucketexplorer.com/documentation/amazon-s3—what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [online], Dec. 12, 2010; [Retrieved on Jan. 20, 2011] Retrieved from the Internet <URL: http://en.wikipedia.org/wiki/OAuth>; 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia., Anycast [Retrieved on Oct. 10, 2011] Retrieved from the Internet: URL<http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.

Chen, Per M., et al., : "Maximizing Performance in a Striped Disk Array", 17th Annual International Symposium on Computer Architecture (SIGARCH 1990), 18 pages.

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Vazhkudai, Sudharshan S., et al.; "Constructing Collaborative Desktop Storage Caches for Large Scientific Datasets"; ACM Journal Name, vol. V, No. N, Jun. 2006, 34 pages.

OMG, Deployment and Configuration of Component-based Distributed Applications Specification—Version 4.0, OMG, 2006, pp. 1-160.

Cala et al., "Automatic Software Deployment in the Azure Cloud", IFIP International Federation for Information Processing, 2010, pp. 1-14.

RSA Laboratories, "PKCS #11 v2.20: Cryptographic Token Interface Standard," Jun. 28, 2004, RSA Security Inc. (407 pages).

Amazon Auto Scaling—Getting Started Guide—API Version Aug. 1, 2010. Amazon Web Services LLC, 2010, 20 pages.

Amazon Auto Scaling—Developer Guide—API Version Aug. 1, 2010. Amazon Web Services LLC 2011, 62 pages.

Amazon CloudWatch—Developer Guide—API Version Aug. 1, 2010. Amazon Web Services LLC, 2010, 75 pages.

Benincosa. "Ganglia and Nagios, Part 2: Monitor enterprise clusters with Nagios-Install Nagios to effectively monitor a data center; make Ganglia and Nagios work together," 2009, 20 pages.

'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.

'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.

'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.

Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.

Paravirtualization, Wikipedia Article, downloaded from http://en.wikipedia.org/wiki/Paravirtualization on Mar. 18, 2012.

Paravirtualized File Systems, Eric Van Hensbergen, downloaded from http://www.slideshare.net/ericvh/9p-on-kvm on Mar. 18, 2012.

"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.

"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.

Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.

How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.

Uploading Personal ssh Keys to Amazon EC2, Eric Hammond, Oct. 14, 2010. Retrieved from the Internet: <URL:http://alestic.com/2010/10/ec2-ssh-keys>, 3 pages.

Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.

Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.

Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.

Live Migration of Virtual Machines, Clark et al., University of Cambridge Laboratory, Department of Computer Science; University of Copenhagen, Denmark, 2005; 14 pages.

Making Services Easy to Migrate, Debian Administration, System Administration Tips and Resources, Jan. 1, 2005, 5 pages.

(56) References Cited

OTHER PUBLICATIONS

L. Gommans, et al., Token-Based Authorization of Connection Oriented Network Resources, 1st International Workshop on Networks for Grid Applications (GridNets 2004), Oct. 29, 2004; 8 pages.

Hyun, Ahn Ji, Authorized Officer for Korean Intellectual Property Office, International Search Report and Written Opinion for PCT/US2012/021846, International Search Report completed May 25, 2012, 8 pages.

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, 2000, vol. 39, Issue 1, pp. 211-238.

Cabellos et al., LISPmob: Mobile Networking through LISP, Apr. 2, 2012, 8 pages.

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24, 2013, 11 pages.

Eng, Lili, Australian Government, IP Australia, Examiner's First Report for 2012200562, dated Jun. 4, 2012, 2 pages.

\* cited by examiner

TRANSPARENT LOAD-BALANCING FOR CLOUD COMPUTING SERVICES

BACKGROUND

This patent document relates to operating virtual machines in a cloud computing service.

Cloud computing is network-based computing in which typically large collections of servers housed in data centers or "server farms" provides computational resources and data storage as needed to remote end users. Some cloud computing services allow entities, such as e-retailers, banks with online portals, and universities, to run server software applications (e.g., e-commerce server application, web server, or file server) in the cloud. Running applications in the cloud can include running processes on virtual machines that are provided by cloud service providers. Data centers can use load-balancing to deal out incoming data among two or more machines. A type of load-balancing can be performed by using a special-purpose Open Systems Interconnection model (OSI model) layer-2 hardware device residing between an incoming network connection and a private local area network that forms a contiguous layer-2 network, where the local network includes two or more machines that are interconnected via the contiguous layer-2 network. For example, such a machine can employ an Address Resolution Protocol (ARP) scheme to maintain availability of a virtual Media Access Control (MAC) address on a contiguous layer-2 network that corresponds to a load-balanced network address.

SUMMARY

In general, one aspect of the subject matter described in this document can be embodied in a technique that includes executing virtual machines that are each configured to communicate via a virtual network and are configured to handle requests associated with at least a destination address on a public network; and operating gateways, including a first gateway and a second gateway, that are configured to provide connectivity between the virtual network and the public network, the gateways being configured to use a consistent mapping operation to perform load-balancing among the virtual machines. The technique includes obtaining health information of the virtual machines; determining, based on the health information of the virtual machines, a group of healthy virtual machines comprising two or more of the virtual machines; receiving, at the first gateway, an incoming packet that includes a source address and the destination address; selecting, at the first gateway, a handling virtual machine of the group of healthy virtual machines based on an output of the consistent mapping operation given the source address, the destination address, and the group of healthy virtual machines; forwarding, at the first gateway, the incoming packet to the handling virtual machine via the virtual network; and creating, in a data structure at the first gateway, an entry reflecting a mapping between the source address and the handling virtual machine to forward one or more additional incoming packets, each including the source address and the destination address, to the handling virtual machine. Other embodiments of this aspect include corresponding systems, apparatus, and computer programs encoded on computer storage devices.

These and other aspects can optionally include one or more of the following features. The incoming packet can be a first incoming packet. Implementations can include receiving, at the second gateway, a second incoming packet that includes the same source address and the same destination address as the first incoming packet; selecting, at the second gateway, the handling virtual machine based on an output of the consistent mapping operation given the source address and the group of healthy virtual machines; forwarding the second incoming packet to the handling virtual machine via the virtual network; and creating, in a data structure at the second gateway, an entry reflecting a mapping between the source address and the handling virtual machine to forward one or more additional incoming packets to the handling virtual machine.

Obtaining the health information can include sending packets to check respective virtual machines and receiving one or more responses to the sent packets. Selecting the handling virtual machine can include generating a flow identifier based on the source address, the destination address, a source port of the incoming packet, and a destination port of the incoming packet. Selecting the handling virtual machine can include using the flow identifier as input to a hash function to produce a hash value; and selecting a virtual machine based on the hash value. Selecting the handling virtual machine can include using the source address, the destination address, a source port of the incoming packet, and a destination port of the incoming packet. Selecting the handling virtual machine can be further based on a geographical proximity of a virtual machine to a geographical location associated with an origin of the incoming packet.

Forwarding the incoming packet to the handling virtual machine can include sending the incoming packet to the handling virtual machine without changing the destination address. The virtual machines, including the handling virtual machine, can include a network interface that is configured to receive packets that are addressed to the destination address. Forwarding the incoming packet to the handling virtual machine can include performing a network address translation (NAT) on the incoming packet where the destination address of the incoming packet is replaced with a network address of the handling virtual machine, the network address being private to the virtual network. In some implementations, the virtual network is for IP based communications. Operating the gateways can include using separate IP tunnels to effect delivery of IP packets on the virtual network to the virtual machines.

Systems can include two or more host machines that are configured to execute virtual machines that communicate via a virtual network, the virtual machines being configured to handle requests associated with at least a destination address on a public network; and two or more gateways that provide connectivity between the virtual network and the public network, the gateways being configured to use a consistent mapping operation to perform load-balancing among the virtual machines. The two or more gateways can be configured to obtain health information of the virtual machines, determine, based on the health information of the virtual machines, a group of healthy virtual machines comprising two or more of the virtual machines, receive an incoming packet that includes a source address and the destination address, select a handling virtual machine of the group of healthy virtual machines based on an output of the consistent mapping operation given the source address, the destination address, and the group of healthy virtual machines, forward the incoming packet to the handling virtual machine via the virtual network, and create a data structure entry reflecting a mapping between the source address and the handling virtual machine to forward one or more additional incoming packets, each including the source address and the destination address, to the handling virtual machine.

Particular embodiments of the subject matter described in this document can be implemented so as to realize one or more of the following advantages. The application of load-balancing to a virtual network can be accomplished in ways which do not require synchronized state tables among gateways residing at a physical-to-virtual network boundary. Load-balancing a service resource among two or more virtual machines can increase the overall availability of the service resource. One or more described load-balancing techniques can be performed transparently based on one or more properties of the virtual network. One or more of the described load-balancing techniques can be implemented using virtual machines residing on separate layer-2 networks, and do not require a contiguous layer-2 network, broadcast mechanism, or native network support for load-balancing.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
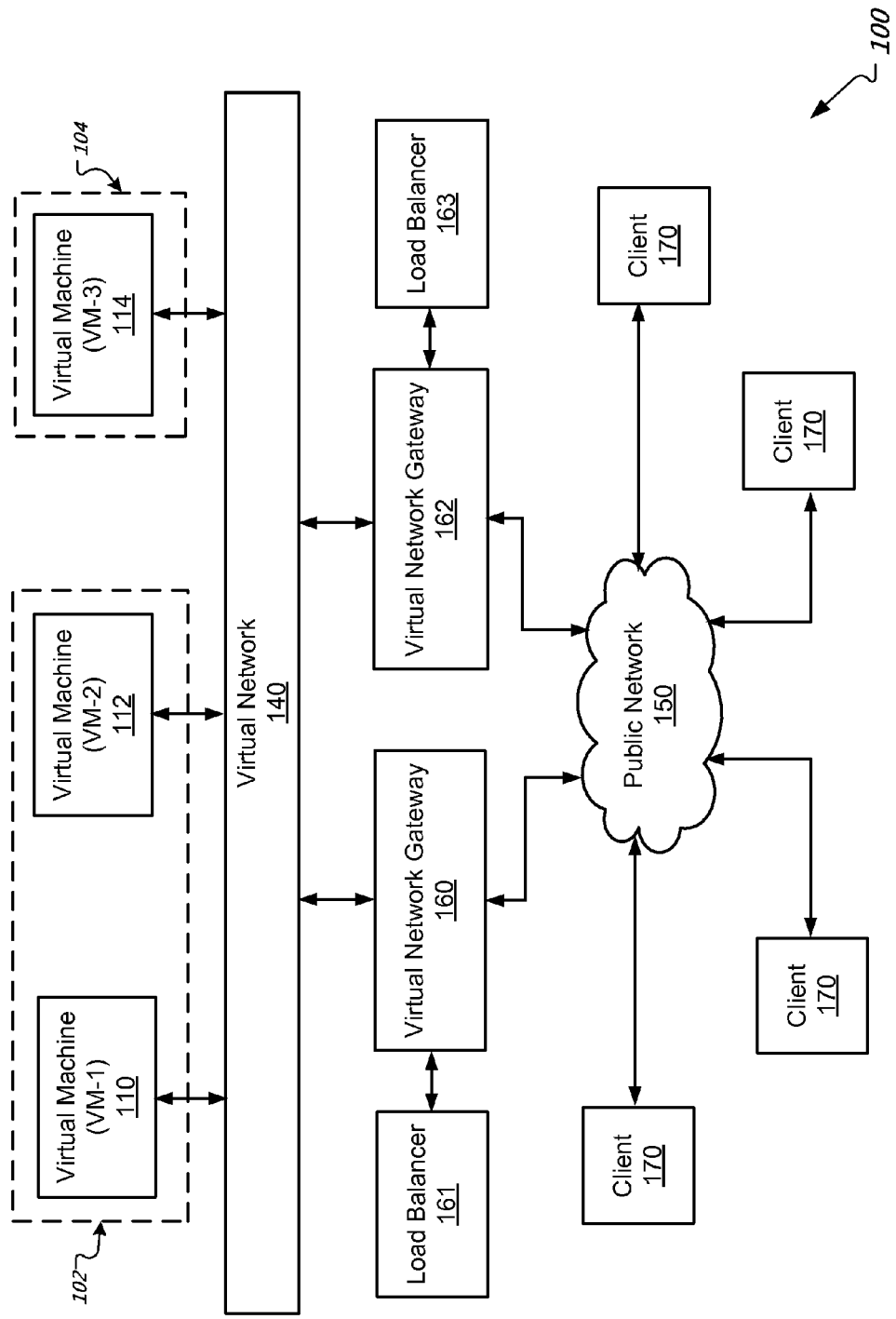
FIG. 1 shows an example of a transparent distributed virtual machine load-balancing system.

FIG. 1 shows an example of a transparent distributed virtual machine load-balancing system. A distributed system 100 can run virtual machines (VMs) 110, 112, 114, on host machines 102, 104. The distributed system 100 can provide a virtual network 140 to the virtual machines 110, 112, 114 for Internet Protocol (IP) based communications. Elements of the distributed system 100 can reside in different physical locations. For example, a first host machine 102 can reside in a first data center, while a second host machine 104 can reside in a second data center. In some implementations, these data centers can be located in different states, countries, or both. Nevertheless, the virtual network 140 can interconnect virtual machines residing on geographically distributed host machines. The virtual machines 110, 112, 114 are assigned network addresses (e.g., an IPv4 address or IPv6 address) that are routable on the virtual network 140. In some implementations, the virtual network 140 includes a private subnet (e.g., 192.168.0.0/16 or 10.0.0.0/8).

Clients 170 can send packets to a destination address associated with the public network 150. The packets can be User Datagram Protocol (UDP) based packets or Transmission Control Protocol (TCP) based packets. Other types of packets are possible. The clients 170, for example, can send a request in a packet to a web site such as "www.xyz.com" using Hypertext Transfer Protocol (HTTP). The network address associated with "www.xyz.com" can be load-balanced between virtual machines 110, 112, 114 interconnected via the virtual network 140. The load for a web site can be distributed among multiple virtual machines such as hundred virtual machines, a thousand virtual machines, or more.

Load balancers 161, 163 can be configured to control virtual network gateways 160, 162 to distribute traffic from clients 170 among the virtual machines 110, 112, 114. In this example, virtual network gateways 160, 162 route traffic between virtual machines 110, 112, 114 and the public network 150 via the virtual network 140. In some implementations, the gateways 160, 162 include their corresponding load balancers 161, 163. In some implementations, servicing a connection from a client 170 can require the use of state information, and therefore the load balancers 161, 163 can cause the virtual network gateways 160, 162 to consistently route IP traffic from the same client to the same virtual machine. However, based on a failure of a virtual machine, a load balancer can selected a new virtual machine for servicing requests from a specific client 170.

In some implementations, virtual network gateways 160, 162 are configurable to selectively load-balance traffic based on parameters set via an application programming interface (API). For example, a cloud service customer can use the API to select a load-balancing option for one or more network addresses. In some implementations, the load-balancing option can be applied to one or more ports such as a TCP port or UDP port.

IP traffic on the virtual network 140 can be carried by IP tunnels. Machines such as host machines 102, 104 and virtual network gateways 160, 162 can perform IP encapsulation and de-encapsulation for IP traffic to and from each VM 110, 112, 114. Encapsulated IP traffic from one VM is sent to another VM via IP tunneling. An IP tunnel provides a transport layer. For example, IP tunneling can include sending an IP tunnel packet that includes an encapsulated packet. The encapsulated packet can be an IP packet. Other types of encapsulated packets are possible. In some cases, an IP tunnel can originate at a virtual network gateway and terminate at a host machine. In some cases, an IP tunnel can both originate and terminate on the same host machine (e.g., source and destination VMs are on the same host machine). In some cases, an IP tunnel can originate at one host machine and terminate at a different host machine (e.g., source and destination VMs are on different host machines). IP tunnel traffic between machines residing on separate layer-2 networks can be carried over a virtual private network (VPN) via a public network 150 such as the Internet.

Host machines 102, 104 can use a virtual network routing table to retrieve the endpoint locations of the IP tunnels. In some implementations, based on an input VM identifier or VM IP address, a virtual network routing table provides a routable IP address on network 150 that corresponds to the host machine that runs the VM associated with the input VM identifier or VM IP address. In some implementations, the host machines 102, 104 can run multiple virtual networks. For example, two virtual machines can be on the same physical machine, but attached to different virtual networks. Further-more, a virtual machine can have one or more virtual network interface cards (NICs) that are attached to one or more virtual networks. Each virtual network interface can be assigned a network address (e.g., IPv4 address, IPv6 address, or a layer-2 MAC address). In some implementations, a virtual machine stores virtual network addresses and their associated network identifiers.

Figure 2:
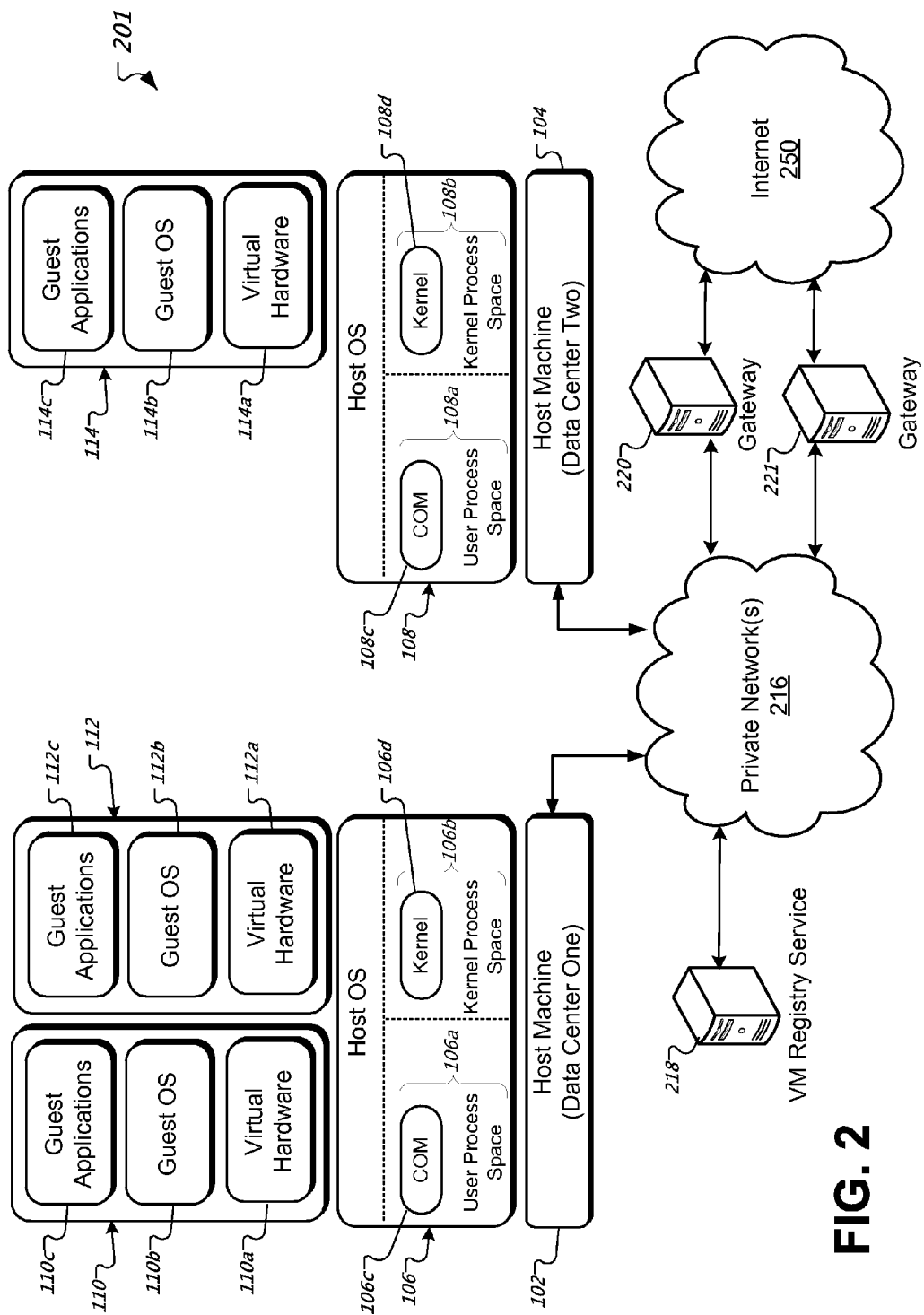
FIG. 2 shows another example of a transparent distributed virtual machine load-balancing system.

FIG. 2 shows another example of a transparent distributed virtual machine load-balancing system. Host machines 102, 104 included in a distributed system 201 can contain one or more data processing apparatuses such as rack mounted servers or other computing devices. Host machines 102, 104 can have different capabilities and computer architectures. Host machines 102, 104 can communicate with each other through a network such as a private network 216 (e.g., dedicated or leased optical fiber or copper wires). Host machines 102, 104 can also communicate with devices on public networks, such as the Internet 250, through one or more gateways 220, 221 which are data processing apparatus responsible for routing data communication traffic between the private network 216 and the Internet 250. Other types of public networks are possible.

The private network 216 can include one or more wired (e.g., Ethernet) or wireless (e.g., WI-FI) networks, for example. In some implementations, the private network 216 includes physical communication assets such as optical fiber or copper wire that connect two data centers. In some implementations, the private network 216 is implemented over a public network such as the Internet 250. In some implementations, data centers have respective local area networks (LANs) that are aggregated together to form a private network 216. IP traffic between data centers can be routed, for example, by using Multiprotocol Label Switching (MPLS). Other types of routing are possible.

Each host machine 102, 104 executes a host operating system 106, 108. A host operating system 106, 108 manages host machine resources. In this example, host operating systems 106, 108 run software that virtualizes the underlying host machine hardware and manages concurrent execution of one or more VMs. For example, the host operating system 106 manages two VMs (VM 110 and VM 112), while a different host operating system 108 manages a single VM 114. A host machine can, in general, manage larger quantities of virtual machines; however, the quantity may be limited based on physical resources of the host machine.

The VMs 110, 112, 114 use a simulated version of an underlying host machine hardware, which can be referred to as virtual hardware (e.g., virtual hardware 110a, 112a and 114a). Software that is executed by the virtual hardware can be referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112, and 114) is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persistent across VM restarts. In some implementations, virtual disk blocks are allocated on physical disk drives coupled to host machines. VMs can be allocated network addresses through which their respective processes can communicate with other processes via a virtual network. For example, guest software executing on VM 110 can communicate with guest software executing on VM 112 or VM 114 via the virtual network using the allocated network addresses.

A VM's guest software can include a guest operating system (e.g., guest operating systems 110b, 112b, and 114b) which is software that controls the execution of respective guest software applications (e.g., guest applications 110c, 112c, and 114c), within the VM and provides services to those applications. For example, a guest operating system can be an operating system such as a variant of the UNIX operating system. Other operating systems are possible. Each VM can execute the same guest operating system or different guest operating systems. Booting a VM can include using a virtual boot disk to load a kernel image associated with a guest operating system into memory. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, one for each VM executing on a host machine. In yet further implementations, some portion of the communication process executes in the user process space and another portion executes in the kernel process space. In some implementations, the communication process can use a hardware level encapsulation mechanism.

A communication process 106c, 108c can communicate with a VM registry service 218 to establish a virtual network pair (VNP) between two VMs. In a virtual network, a VNP can be used to route traffic between two endpoints using one or more virtual connections or links. Network traffic associated with the VNP can be carried via a local loop (e.g., if both VMs are on the same host machine) or carried via one or more networks, such as a private network 216, Internet 250, or a combination thereof. For example, a VNP between a first virtual machine 110 and a second virtual machine 114 can be used to route packets sent between VNP endpoints managed respectively by first and second communication processes 106c, 108c over the private network 216. In some implementations, a server such as a VM registry server 218 implements the functionality of the VM registry service. The VM registry service 218 can manage assignments of network addresses (e.g., IP addresses) to VMs, and maintain mappings between VM network addresses on a virtual network and the respective network addresses of the host machines running the VMs.

Figure 3:
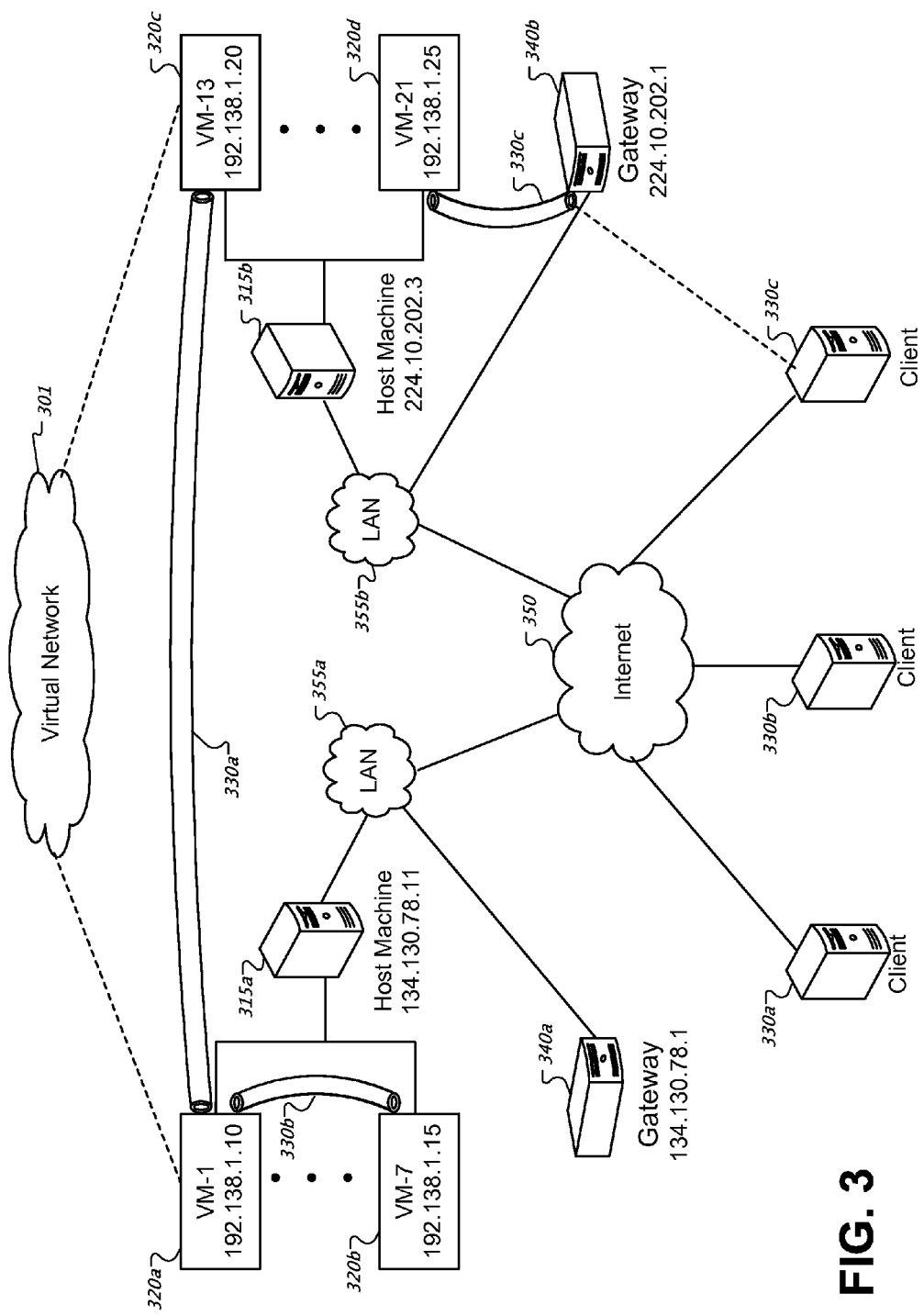
FIG. 3 shows examples of packet encapsulation techniques used in a transparent distributed virtual machine load-balancing system.

FIG. 3 shows examples of packet encapsulation techniques used in a transparent distributed virtual machine load-balancing system. A distributed system can contain server systems that include host machines 315a, 315b, which are configured to run one or more virtual machines 320a, 320b, 320c, 320d. Host machines 315a, 315b use IP tunnels 330a, 330b, 330c to carry IP traffic between the virtual machines 320a-d as well as IP traffic between the virtual machines 320a-d and virtual network gateways 340a, 340b. The virtual network gateways 340a-b are configured to provide Internet 350 access to the virtual machines 320a-d.

The host machines 315a, 315b can connect to the Internet 350 via respective local area networks (LANs) 355a, 355b. In some implementations, host machines 315a-b are assigned IP addresses (e.g., 134.130.78.11, 224.10.402.3) that are visible on the Internet 350. Traffic on an inter-host-machine IP tunnel 330a (e.g., IP tunnel packets) can be routed from the host machine 315 on a first LAN 355a to a host machine 315b on a second LAN 355b via the Internet 350 (tunnel 330a carries traffic between VM-1 320a and VM-13 320c). Traffic on an intra-host-machine IP tunnel 330b can be routed completely inside a host machine 315a.

Virtual network gateways 340a-b can route traffic between the Internet 350 and the virtual network 301 by changing source or destination address information in packet headers so that the address space of the virtual network 301 is hidden behind an IP address of a gateway 340a-b. In particular, packets arriving at the gateways 340a-b from the Internet 350 and bound for the virtual network 301 have their IP datagram destination address changed from that of the gateway 340a-b (e.g., 134.130.78.1, or 224.10.402.1) to the IP address of a destination VM (e.g., 192.138.1.10). Packets arriving at a gateway 340a-b from the virtual network 301 and bound for the Internet 350 have their IP source address changed from that of a VM (e.g., 192.138.1.10) to the IP address of the virtual network gateway 340a-b that is visible on the Internet 350 (e.g., 134.130.78.1, 224.10.402.1). Based on the virtual network 301 using a private subnet, the virtual network gateways 340a-b can perform network address translation (NAT) to translate between private subnet addresses and public addresses.

Virtual machines 320a-d running on the host machines 315a-b can run processes such as webserver processes that interact with browser software running on clients 330a, 330b, 330c. A client 330a-c can be a data processing apparatus such as, for example, a server, a personal computer, a laptop computer, a smart phone, an embedded device (e.g., a smart power meter), or a tablet computer. In this example, client 330c communicates with a VM (e.g., VM-21 320d) by sending IP packets to a virtual network gateway 340b. In turn, the virtual network gateway 340b encapsulates the packets from the client 330c and sends the encapsulated packets to the host machine 315b running VM-21 320d via an IP tunnel 330c. The host machine 315b running VM-21 320d can de-encapsulate the packets and deliver the packets to VM-21 320d.

Communication processes can use keys to protect IP traffic to and from VMs. In some implementations, before a VM can send packets to or receive packets from other VMs or a gateway, a network agent for a VM retrieves a secret key that corresponds to the VM. In some implementations, a network agent is included in a communication process executing on the VM's host machine. A secret key is a piece of information that serves to uniquely identify a VM among all VMs associated with a virtual network (e.g., the virtual network 140 of FIG. 1). The secret key can be a number, a string of characters, other data, combinations of these, or any other string of bits of sufficient entropy. The secret key can be generated in such a way that an entity with no prior knowledge of the key has no computationally feasible way of deriving the key. The secret key can be generated using, for example, a cryptographically secure pseudorandom number generator. In some implementations, the secret key is assigned to a VM by a VM registry service. Secret keys can also be assigned by another process besides the VM registry service. A given VM may not know what its secret key is and does not know the secret key of other VMs. In some implementations, a communication process (e.g., communication process 106c) on a given host machine (e.g., host machine 102) keeps track of the secret keys for VMs managed by the host operating system (e.g. host operating system 106).

Figure 4:
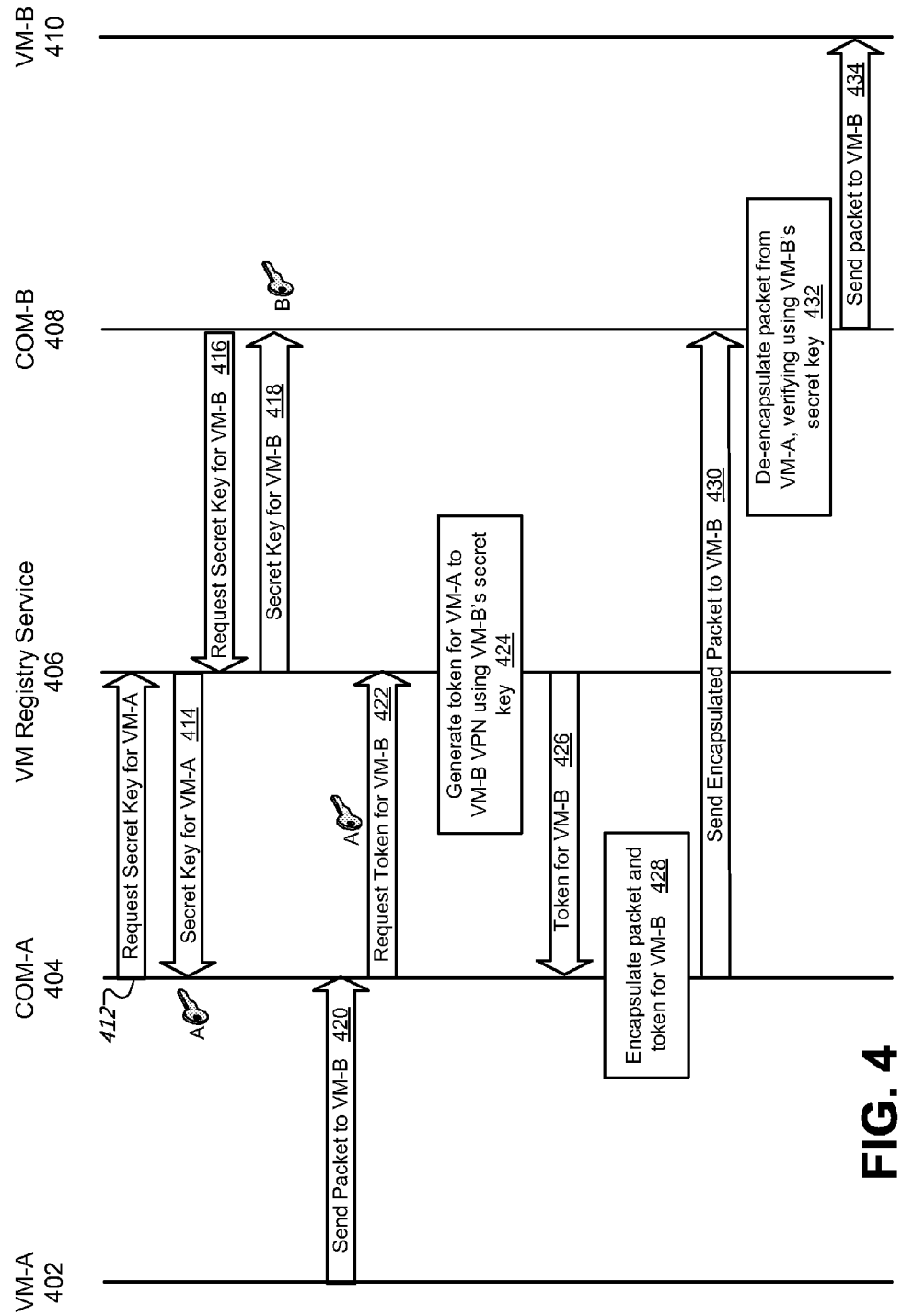
FIG. 4 shows an example of a token negotiating and message sending technique.

FIG. 4 shows an example of a token negotiating and message sending technique. The communication process 404 (COM-A process 404) on VM-A 402's host machine can request a secret key for VM-A 402 from the VM registry service 406 by sending a message, at 412, to the VM registry service 406. The request for the secret key can be sent via a secure protocol (e.g., secure socket layer (SSL) or Diffie-Hellman) that allows the VM registry service 406 to authenticate which communication process it is communicating with. Other communications between the VM registry service and COM-A process 404 or other communication processes can also use the same secure protocol.

The VM registry service 406 responds to the COM-A process 404 with a message 414 containing the secret key for VM-A. As a further example, the communication process 408 (COM-B process 408) on VM-B 410's host machine can request a secret key for VM-B 410 from the VM registry service 406 by sending a message 416 to the VM registry service 406. Based on receiving a message from the COM-B process 408, the VM registry service 406 responds with a message 418 containing the secret key for VM-B 410.

Before an initial packet from one VM to another is transmitted, a VNP between the two VMs is established. In some implementations, the communication process on a given host machine is responsible for establishing VNPs. Each VM can communicate with one or more other VMs using a separate VNP for each. VM-A 402 initiates a transmission of a packet 420 to VM-B 410. The packet can include one or more headers such as an IPv4 header, IPv6 header, UDP header, or a TCP header. The packet is intercepted by the COM-A process 404 of the host operating system on which VM-A 402 is executing. The COM-A process 404 determines that a VNP between VM-A 402 and VM-B 410 has not yet been established. This being the case, the COM-A process 404 requests a token to be used to communicate with VM-B 410 from the VM registry service 406. A token is required in order to establish a unidirectional VNP from a source VM to a destination VM. The token request 422 can contain the secret key for VM-A 402 and a network address of the destination VM-B 410, for example.

In response to the request 422, the VM registry service 406 uses the secret key S_a of VM-A 402 to look up or determine the following attributes of VM-A 402: IP_VM_a, the IP address assigned to VM-A; Phys_Port_a, the UDP port assigned to VM-A on VM-A's host machine; Phys_IP_a, the IP address of VM-A's host machine; and expiry_a_b, the validity period of the token which, in some implementations, is the current time plus a time-to-live (TTL). The TTL can be on the order of minutes (e.g., 10 minutes) or other granularities. In some implementations, expiry_a_b is set to a value (e.g., −1) to indicate that the token never expires. In some implementations, the concatenation of Phys_Port_a and Phys_IP_a can be considered as a VM host address.

In some implementations, the VM registry service 406 verifies that the request 422 was actually transmitted from Phys_IP_a and otherwise denies the request. In further implementations, the VM registry service 406 can consult a traffic policy to determine if VM-A 402 should be allowed to communicated with VM-B 410 and, if not, denies the request.

In various implementations, the VM registry service 406 computes the token T_a_b for traffic from VM-A 402 to VM-B 410 as follows (step 424): T_a_b=TruncMAC (S_b, Phys_IP_a|Phys_IP_b|Phys_Port_a|Phys_Port_b|IP_VM_a|IP_VM_b|expiry_a_b), where '|' denotes concatenation, S_b is VM-B 410's secret key, and TruncMAC is a Message Authentication Code (MAC) function (e.g., a function based on HMAC-SHA1) that has been truncated, for example, to 64 bits. Other MAC functions are possible. In some implementations, all of the fields being concatenated are fixed size, i.e., the concatenation is uniquely determined without the need for separators. Although the fields are concatenated in a certain order, other field orderings are possible. In some implementations, the concatenation of Phys_Port_b and Phys_IP_b can be considered as a VM host address.

In some implementations, a secret key ties a host machine addressing scheme (e.g., <Phys_IP, Phys_Port>) to a VNP addressing scheme (e.g., IP address of VM on a virtual network). In some implementations, a secret key ties a host machine addressing scheme (e.g., <Phys_IP, Phys_Port>) to a memory region associated with a VM via remote direct memory access (RDMA).

The VM registry service 406 returns the tuple (Phys_IP_b, Phys_Port_b, T_a_b, expiry_a_b) to COM-A process 404 in a response 426 to the request 422, where Phys_IP_b is the IP address of the host machine on which VM-B 410 is executing and Phys_Port_b is the UDP port on VM-B's host machine that has been reserved for receiving traffic directed to VM-B 410. Once the COM-A process 404 receives the tuple, the packet 420 can be encapsulated, at 428.

At 430, the encapsulated packet is transmitted to VM-B's host machine using the Phys_IP_b and Phys_Port_b as the destination address of the packet. Future packets destined for VM-B 410 can reuse the tuple information until expiry_a_b has passed. Once the expiry_a_b has passed (if it is not set to a value indicating that the token never expires), a new token can be obtained as described above, for example. For VM-B 410 to send packet to VM-A 402, a token can be used to establish a unidirectional VNP from VM-B 410 to VM-A 402. The same process can be followed as outlined above or, alternatively, a packet sent from VM-A to VM-B can include the token.

The encapsulated packet is received by the destination host machine for VM-B 410 where it is intercepted by the COM-B process 408. At 432, the COM-B process 408 de-encapsulates the packet and verifies it based on VM-B's secret key. At 434, the COM-B process 408 sends the de-encapsulated packet to VM-B 410. This can be done by injecting the IP packet into the network stack as an Ethernet frame, for example.

Figure 5:
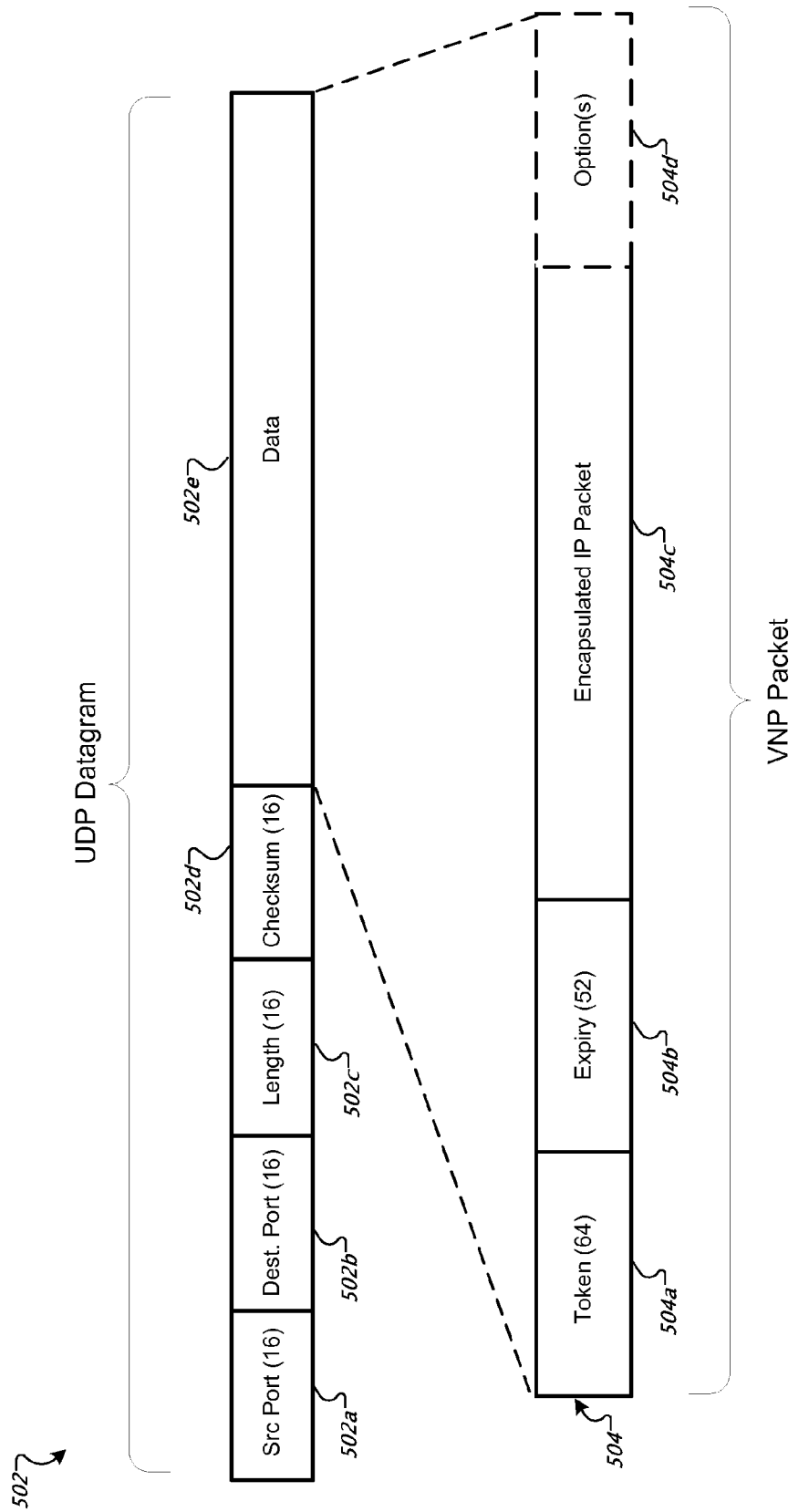
FIG. 5 shows an example of an encapsulated packet.

FIG. 5 shows an example of an encapsulated packet. A communication process can receive an outgoing packet generated by a VM. The outgoing packet is encapsulated in a data portion 502e of a UDP packet 502. In other words, the data portion 502e includes an encapsulated packet, such as an encapsulated IP packet 504c, that includes the outgoing packet.

The UDP packet 502 contains a header that includes a source port number 502a (16 bits), a destination port number 502b (16 bits), a length field 502c (16 bits) which is the length of the data portion 502e, and a checksum 502d (16 bits). In various implementations, the source port 502a is set to Phys_Port_a and the destination port 502b is set to Phys_Port_b. The data portion 502e is variable length and contains the outgoing packet. In some implementations, the data portion 502e can be encrypted. Symmetric or asymmetric encryption key algorithms can be used to encrypt some or all of the data portion 502e, for example. The encryption keys can be distributed by a VM registry service, e.g., VM registry service 218 of FIG. 2. In some implementations, a conventional key negotiation protocol, e.g., the Diffie-Hellman protocol, can be used in an encryption of the data portion 502e.

The UDP packet's data portion 502e contains a VNP packet 504. A VNP packet 504 can include the token T_a_b 504a (64 bits), the expiry time expiry_a_b 504b (32 bits), the outgoing packet 504c (variable length), and an optional options field 504d (variable length). Other lengths for the VNP packet fields are possible. In addition, the fields of the VNP packet 504 can occur in a different order than that which is illustrated in FIG. 5. In some implementations, the outgoing packet is an IP packet. Other outgoing packet types are possible including, for example, Ethernet packets. Once encapsulation is complete, the communication process or another process on the respective host machine's operating system can transmit the UDP packet 502 in an IP packet with a source IP address of Phys_IP_a and a destination IP address of Phys_IP_b. Alternatively, the encapsulated packet can be transmitted using a different protocol.

In some implementations, the VNP packet 504 includes an options field 504d. The options field 504d allows a sending VM to convey additional information to a receiving VM. If the encapsulated packet is a UDP packet, as illustrated in FIG. 5, the length of the options field can be calculated based on the difference of the value specified in the length 502c field and the combined size of the token 504a, expiry 504b, and encapsulated IP packet 504c fields. The size of the encapsulated IP packet 504c is available in the header of the packet 504c. The options field 504d can be omitted from the VNP packet 504 if its inclusion would push the size of the encapsulated packet (e.g., UDP packet 502) above the maximum transmission unit (MTU) which would result in packet fragmentation. In further implementations a field such as a bit flag, for example, can be added to the VNP packet 504 to indicate the presence of an options field 504d.

The options field 504d can be used to send a return VNP token T_b_a to the receiving VM in order to avoid the receiving VM having to obtain a token in order to reply to the sending VM. The COM-A process 404 for VM-A 402 has all information on hand that is needed to compute T_b_a; in particular, the token is signed with VM-A 402's secret key S_a. The return token T_b_a can likely be included in the first packet sent between VM-A 402 and VM-B 410 since, in the case of TCP, the first packet is a small SYN packet which leaves sufficient room for the options field 504*d* containing the return token without the resulting encapsulated packet exceeding MTU. The options field 504*d* can also be used to send various protocol extensions, to exchange encryption keys, to send control flow information, and so on.

Figure 6:
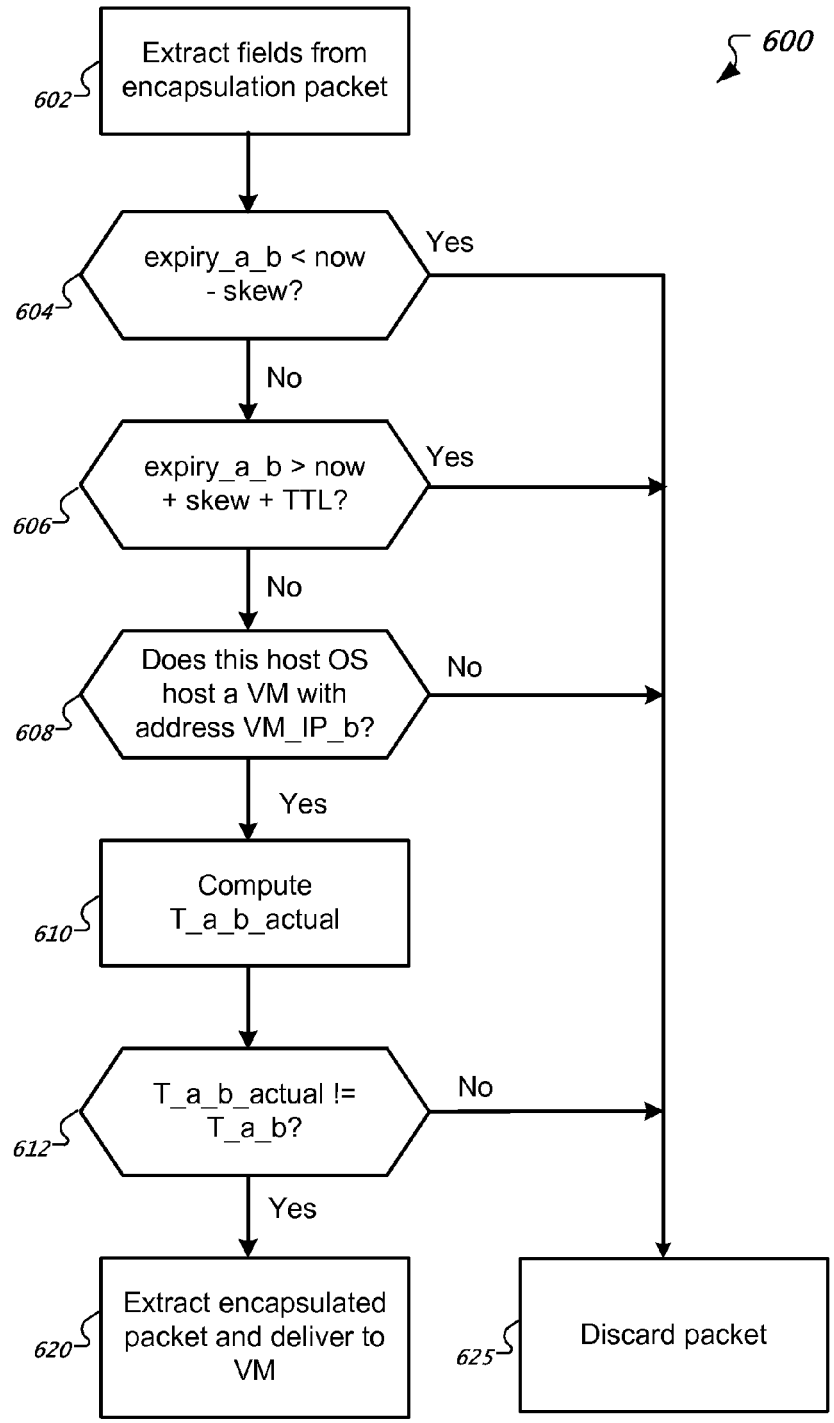
FIG. 6 shows an example of a packet de-encapsulation technique.

FIG. 6 shows an example of a packet de-encapsulation technique. A packet de-encapsulation technique 600 can be performed by the communication process 408 or another process on the destination host machine. The de-encapsulation technique 600 can be performed without the need to communicate with the VM registry service 218. When an encapsulated packet is received, fields from the packet can be extracted to validate the packet (step 602). The source and destination IP addresses and ports of the UDP packet are extracted: Phys_IP_a, Phys_IP_b, Phys_Port_a, and Phys_Port_b. The source and destination address of the encapsulated IP datagram are also extracted: IP_VM_a, IP_VM_b. Finally, the token and expiry are extracted from the encapsulation header: T_a_b and expiry_a_b.

If expiry_a_b is less than the current time minus a skew (step 604), the encapsulated packet is discarded (step 625). In some implementations, the skew is an estimate of likely clock skew between host machine clocks (e.g., a few seconds). The skew can be set to zero if host machine clocks are synchronized. Otherwise, if expiry_a_b is greater than the current time plus skew and TTL (step 606), the encapsulated packet is also discarded (step 625). A check is performed to verify whether the host operating system is hosting a VM having the address VM_IP_b (step 608). If not, the encapsulated packet is discarded (step 625). The extracted fields and VM-B 410's secret key S_b are used to calculate T_a_b actual as follows (step 610): T_a_b_actual=TruncMAC(S_b, Phys_IP_a|Phys_IP_b|Phys_Port_a|Phys_Port_b|IP_VM_a|IP_VM_b|expiry_a_b).

T_a_b actual is then compared to the token T_a_b from the encapsulated packet (step 612). If T_a_b actual is the same as T_a_b then the encapsulated packet (e.g., encapsulated IP packet 504*c*) is extracted from the encapsulated packet (e.g., encapsulated packet 502) and is delivered to VM-B 410 (step 620). Otherwise, the encapsulated packet is discarded (step 625).

A gateway (e.g., gateway 220, 221) can serve as an encapsulation gateway to allow virtual machines on a virtual network to communicate with endpoints on a public network such as the Internet. A host machine can send encapsulated packets to the gateway. When the gateway receives encapsulated packet from a VM destined for the public network, the gateway can validate the token of the VNP packet. If the token validation fails, the packet is discarded. If validation succeeds, the encapsulated packet is de-encapsulated and the encapsulated packet is extracted and injected into the gateway's network stack where it is subject to normal routing.

Upon receiving, from the public network, a non-encapsulated packet destined for a VM, the gateway obtains a token for the destination of the packet and then encapsulates the packet. In some implementations, obtaining a token can include communicating with a VM registry service. In some implementations, obtaining a token can include retrieving a token from a local cache of tokens. The gateway 220, 221 then transmits the encapsulated packet to the destination VM's host machine.

If a communication process associated with a VM queries a VM registry service for a token that is for a destination computer that is not on the virtual network, the VM registry service responds with a tuple (Phys_IP_b, Phys_Port_b, T_a_b, expiry_a_b) where Phys_IP_b, Phys_Port_b and Tab are for the gateway, rather than the ultimate destination, so that the VM's packets are routed through, and de-encapsulated by, the gateway. In some implementations, the VM can use this tuple to send packets to any destination on a public network thus avoiding having to obtain a tuple from the VM registry service for each unique destination.

Figure 7:
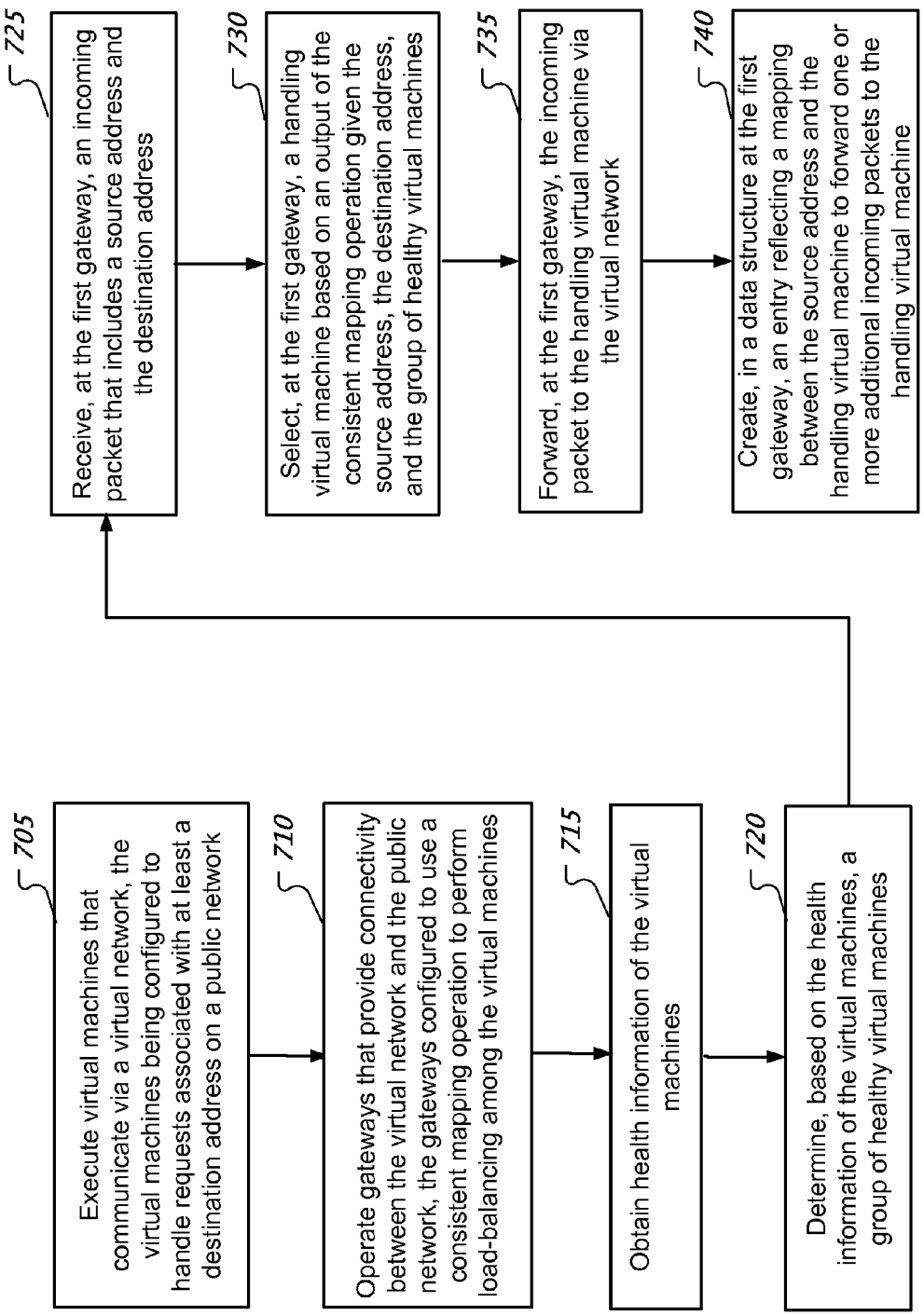
FIG. 7 shows an example of a load-balancing process for virtual machines on a virtual network.

FIG. 7 shows an example of a load-balancing process for virtual machines on a virtual network. At 705, a load-balancing process runs virtual machines that communicate via a virtual network. The virtual machines can be configured to handle requests associated with at least a destination address on a public network. In some implementations, the virtual network is for IP based communications. Operating the gateways can include using separate IP tunnels to effect delivery of IP packets on the virtual network to the virtual machines. At 710, the process operates gateways that provide connectivity between the virtual network and the public network. The gateways can include a first gateway and a second gateway. The gateways can be configured to use a consistent mapping operation to perform load-balancing among the virtual machines.

At 715, the process obtains health information of the virtual machines. Obtain health information for a virtual machine can include pinging a virtual machine or sending an application request (e.g., requesting the homepage of a web-server or requesting a file) to a virtual machine. Obtaining the health information can include sending packets to check respective virtual machines and receiving one or more responses to the sent packets. Receiving a response from a virtual machine in a predetermined amount of time (e.g., 1 second, 2 second, or 10 seconds) signifies that the virtual machine is healthy. The process can routinely update virtual machine health information by scheduling periodic pings to the virtual machine (e.g., once every 10 seconds, 30 seconds, or 60 seconds). For example, obtaining the health information can include periodically sending packets at predetermined intervals to check respective virtual machines and receiving one or more responses to the sent packets. At 720, the process determines, based on the health information of the virtual machines, a group of healthy virtual machines.

At 725, the process receives, at the first gateway, an incoming packet that includes a source address and the destination address. At 730, the process selects, at the first gateway, a handling virtual machine based on an output of the consistent mapping operation given the source address, the destination address, and the group of healthy virtual machines. Selecting the handling virtual machine can include generating a flow identifier based on the source address, the destination address, a source port of the incoming packet, and a destination port of the incoming packet. Selecting the handling virtual machine can include using the flow identifier as input to a hash function to produce a hash value; and selecting a virtual machine based on the hash value.

Selecting the handling virtual machine, at 730, can be further based on a geographical proximity of a virtual machine to a geographical location associated with an origin of the incoming packet. In some implementations, the group of healthy virtual machines used in selecting the handling virtual machine is limited to a subgroup of healthy virtual machines that are geographically closest to the origin of the incoming packet. For example, if there are two healthy virtual machines in Atlanta and two healthy virtual machines in Nevada, a request which is received by a gateway located in New York may prefer to choose the pool of two Atlanta machines rather than the entire pool of four machines in order to improve response time for the request. This decision can be made on a global or per-virtual-address basis.

At 735, the process forwards, at the first gateway, the incoming packet to the handling virtual machine via the virtual network. In some implementations, forwarding the incoming packet to the handling virtual machine includes sending the incoming packet to the handling virtual machine without changing the destination address. The virtual machines, including the handling virtual machine, can include a network interface that is configured to receive packets that are addressed to the destination address. In some implementations, forwarding the incoming packet to the handling virtual machine includes performing a NAT operation on the incoming packet where the destination address of the incoming packet is replaced with a network address of the handling virtual machine, the network address being private to the virtual network.

At 740, the process creates, in a data structure at the first gateway, an entry reflecting a mapping between the source address and the handling virtual machine to forward one or more additional incoming packets to the handling virtual machine. The entry can be indexed by the hash value of a flow identifier that is determined by an incoming packet. The entry can also include a network address of the handling virtual machine. In some implementations, the entry can include the flow identifier.

Figure 8:
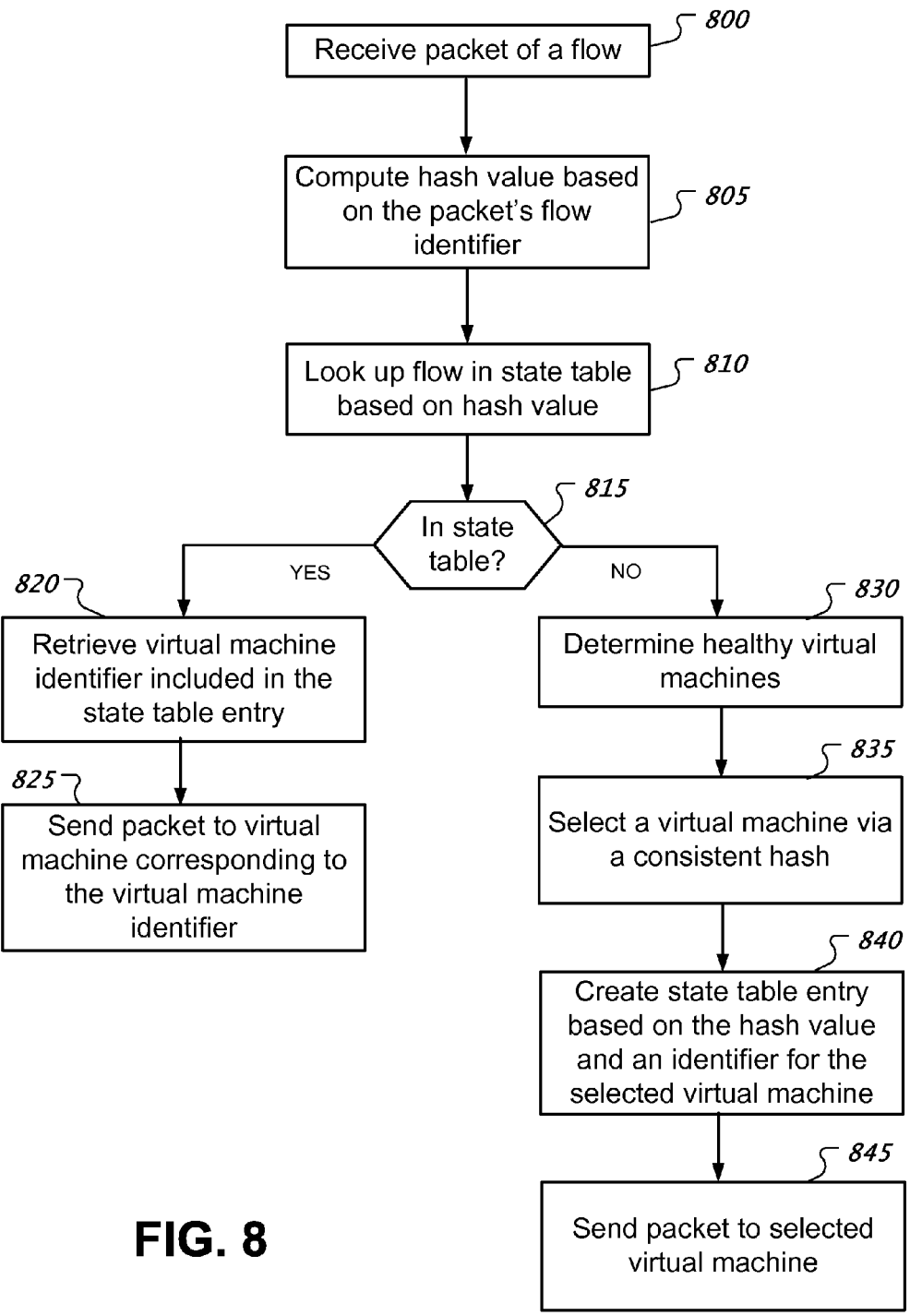
FIG. 8 shows an example of a process that performs a consistent mapping operation.

FIG. 8 shows an example of a process that performs a consistent mapping operation. A process running at a virtual network gateway can use a consistent mapping operation such as a consistent hashing or deterministic mapping to ensure that packets from the same flow, e.g., the same TCP stream or the same UDP stream, are forwarded to the same backend (e.g., virtual machine). Ensuring that packets from the same flow arrive at that same backend can increase efficiency and can leverage previously performed operations. At 800, a process receives a packet of a flow such as an IP flow, a TCP flow, or a UDP flow. A flow can be identified based on the packet's flow identifier. For example, an IP flow can be identified based on the 2-tuple of source IP address and destination IP address. A TCP flow can be identified by the packet's 4-tuple of source IP address, source TCP port, destination IP address, and destination TCP port. A UDP flow can be identified by a packet's 4-tuple of source IP address, source UDP port, destination IP address, and destination UDP port. In some implementations, gateways can track flows at the IP flow level rather than at the higher TCP or UDP flow levels. In some implementations, an IP flow is identified by a 3-tuple that includes source IP address, destination IP address, and protocol identifier. In some implementations, a TCP flow is identified by a 5-tuple that includes source IP address, source TCP port, destination IP address, destination TCP port, and protocol identifier.

At 805, the process computes a hash value based on the packet's flow identifier. For example, a hash function (e.g., MD5 Message-Digest Algorithm or a SHA-2 hash function) maps a packet's flow identifier to a hash value. At 810, the process looks up the flow in a state table based on the hash value. In some implementations, an entry located in a position corresponding to the hash value is retrieved at 810 to determine whether the entry contains the packet's flow identifier.

At 815, the process determines whether the flow is in the state table. In some implementations, determining whether the flow is in the state table includes checking whether an entry contains the packet's flow identifier. If the entry containing the packet's flow identifier, then the flow is deemed to be in the state table. Based on the flow being in the state table, then, at 820, the process retrieves a virtual machine identifier included in the state table entry. At 825, the process sends the received packet to the virtual machine corresponding to the virtual machine identifier.

Based on the flow not being in the state table, then the process, at 830, determines a pool of healthy virtual machines. At 835, the process selects a virtual machine from the pool of healthy virtual machines via a consistent hash. At 840, the process creates a state table entry based on the hash value and an identifier for the selected virtual machine. In some implementations, the state table entry includes an identifier for the selected virtual machine. In some implementations, the state table entry includes the packet's flow identifier. In some implementations, the state table entry includes the hash value. At 845, the process sends the received packet to the selected virtual machine.

A gateway can use consistent hashing to compute a backend array for a pool of healthy virtual machines. In some implementations, the backend array can be recomputed based on a change in the number of healthy virtual machines. A technique for computing a backend array can include allocating an array of size Z, where 0<Z. The technique can include, for each virtual machine in a pool, computing an initial position $P_0$ (where $0 \leq P_0 < Z$) by hashing an identifier K of a virtual machine and marking the slot at position $P_0$ usable for load-balancing if the virtual machine is healthy, where $P_0 = K \% Z$. Given a step size S (where 0<S<Z) and $P_0$, the technique can mark additional slots as usable for load-balancing. In some implementations, the technique marks the slots corresponding to positions based on the expression $P_{i+1} = (P_i + S) \% Z$ for i=0 to N. Marked slots can include an IP address of the virtual machine associated with identifier K and a usability indicator.

For a flow identifier H, a gateway can select a virtual machine identified by position Y in a backend array based on a hash function F, where X=F(H) and Y≥X. In some implementations, F(H)=(H % Z), where Z is the size of the backend array. Other types of hash functions can be used. In some cases, position Y is position X if the entry at position X has an entry that is marked as usable. If position X does not have an entry that is marked as usable, the gateway can iteratively step through higher ranked positions in the backend array until it locates a position Y with an entry that is marked as usable.

Figure 9B:
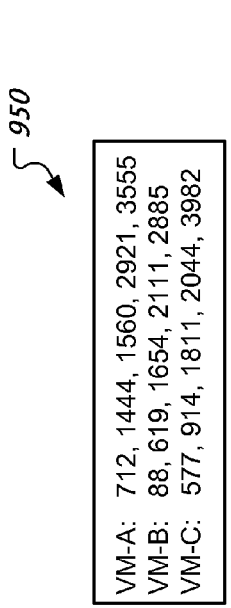
FIG. 9B shows an example of a consistent hash table associated with FIG. 9A.
Figure 9C:
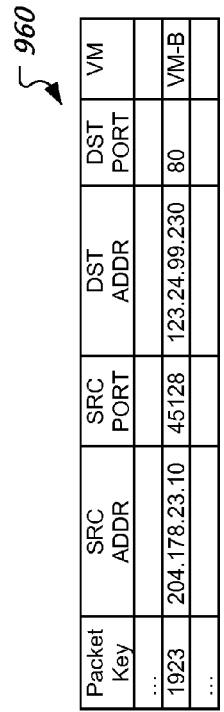
FIG. 9C shows an example of a local state table associated with FIG. 9A.
Figure 9A:
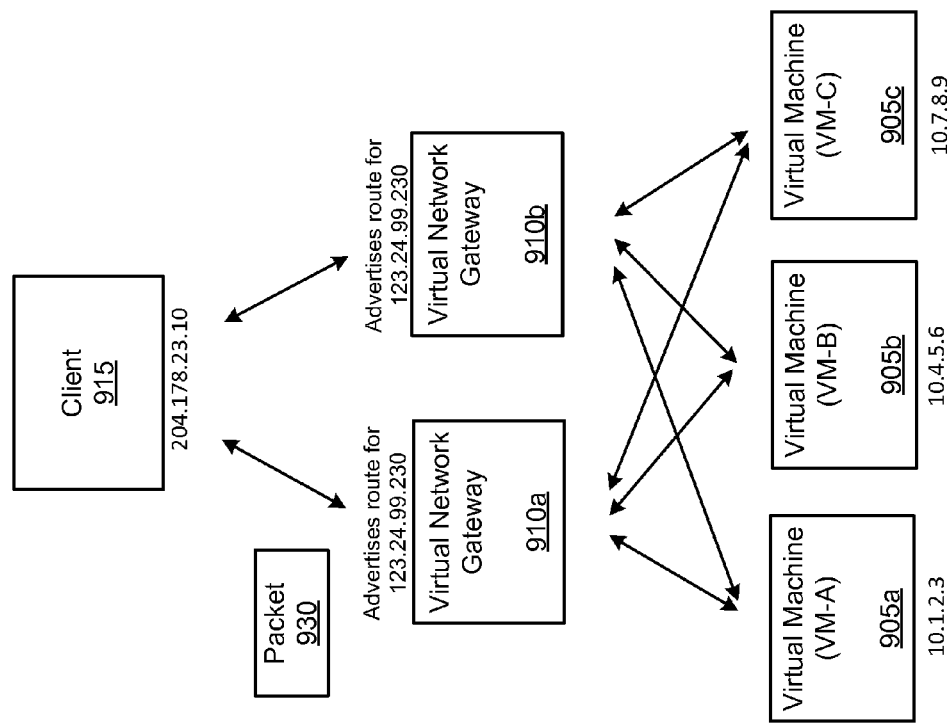
FIG. 9A shows an example of communications among a client, virtual network gateways, and virtual machines.

FIG. 9A shows an example of communications among a client, virtual network gateways, and virtual machines. This example includes virtual machine A (VM-A) 905*a* with a virtual network IP address of 10.1.2.3, virtual machine B (VM-B) 905*b* with a virtual network IP address of 10.4.5.6, and virtual machine C (VM-C) 905*c* with a virtual network IP address of 10.7.8.9. This example also includes a client 915 with an Internet IP address of 204.178.23.10 and two gateways 910*a*, 910*b* to bridge between the Internet and a virtual network. The gateways 910*a*, 910*b* are configured to advertise a route for a webserver with an Internet IP address of 123.24.99.230 and to perform load-balancing on one or more packets 930 having this address as a destination address.

FIG. 9B shows an example of a consistent hash table associated with FIG. 9A. The gateways 910*a-b* create a data structure called a consistent hash table 950 with M different hash values for each backend (e.g., virtual machines 905*a-c*). In this example, M is 5 and the consistent hash table 950 includes entries for VM-A at <712, 1444, 1560, 2921, 3555>, entries for VM-B at <88, 619, 1654, 2111, 2885>, and entries for VM-C at <577, 914, 1811, 2044, 3982>. Other values for M and other types of data structures (e.g., array or linked list) are possible. The different hash values for each backend can be generated by hashing a concatenation of the backend's IP address with different integer values (e.g., 1, 2, 3, 4, and 5). Other techniques are possible. An entry in a consistent hash table 950 can include a hash value, backend identifier (e.g., IP address of virtual address), and a usability indicator. In some implementations, a usability indicator denotes a health status (e.g., healthy or not-healthy) of a virtual machine associated with an entry. Note that FIG. 9B shows one possible depiction of a consistent hash table 950, other depictions and visual representations are possible. For example, a consistent hash table 950 can be stored in a memory as an array.

FIG. 9C shows an example of a local state table associated with FIG. 9A. Note that FIG. 9C shows one possible depiction of a local state table 960, other depictions and visual representations are possible. A gateway 910a uses a local state table 960 to track how its load-balances incoming packets to handling virtual machines 905a-c.

A packet 930, such as a TCP SYN packet or a UDP packet, from the client 915 arrives at the gateway 910a. The packet 930 has a source address port pair of 204.178.23.10:45128 and a destination address port pair of 123.24.99.230:80. The gateway 910a can compute a hash value based on a flow identifier derived from the packet 930. In this example, the flow identifier is a concatenation of source address 204.178.23.10, source port 45128, destination address 123.24.99.230, and destination port 80. This flow identifier hashes to a hash value, for example, of 1923. Based on VM-A and VM-B being healthy and VM-C being not healthy, only hash values for VM-A and VM-B are available. Therefore, the next-higher value is 2111, which indicates that the packet 930 should be sent to VM-B. An entry is created in the local state table 960 at the gateway 910a such that packets having the same flow identifier are forwarded to the same gateway, which in this case is VM-B. The local state table 960 at the gateway 910a is not required to be propagated to other gateways.

Based on making a routing decision using the local state table 960, the gateway 910a sends the packet 930 unchanged to VM-B. Note that the gateway 910a can encapsulate the packet 930 for transport within a virtual network. In some implementations, the gateway 910a performs a NAT operation on the packet 930 and changes its destination address of 123.24.99.230 to 10.4.5.6, where 10.4.5.6 is the private address for VM-B on the virtual network. If the gateway 910a is configured to perform NAT, it translates packets from the virtual machine with source address and port of 10.4.5.6:80 so that the source address and port becomes 123.24.99.230:80.

In response to the packet 930, VM-B can send a response packet, such as a SYN/ACK packet, which is then received by the gateway 910a (with source address and port of 123.24.99.230:80 and destination address and port of 204.178.23.10:45128), and is sent outbound to the client 915. In response, the client 915 sends the return ACK packet (with source address and port of 204.178.23.10:45128 and destination address and port of 123.24.99.230:80) which completes a TCP handshake. If the return ACK packet arrives at the same gateway 910a that handled the original SYN packet 930, the flow identifier corresponding to the return ACK packet (which is the same as the original SYN packet 930) will be found in the local state table 960 and will be accordingly forwarded to VM-B.

In some cases, a subsequent packet in a flow (such as a return ACK packet) may arrive at a different secondary gateway 910b due to an event such as the primary gateway 910a crashing or a route flap. For example, in a scenario where a gateway 910a crashes and all health information remains the same for a brief period of time (e.g. less than one second) at the remaining gateway(s) 910b, the remaining gateway 910b may have the same health information as the crashed gateway 910a and performs a consistent hashing operation. The secondary gateway 910b use its consistent hash table 950 to perform a lookup based on the received packet to determine the handling virtual machine. In this example, given the same health state of the virtual machines 905a-c, the lookup yields a value of 1923 and the next-higher value of 2111—the same values that the crashed gateway 910a would have computed. If the gateways 910a-b have different health states for the virtual machines 905a-c, the probability that the same backend will be chosen by a different gateway is 1−(A/B), where A is the number of virtual machines whose health status has changed, and B is the number of healthy virtual machines in the system.

In an example scenario, where all gateways are operational and VM-C becomes healthy, the return ACK packet is received by the same gateway 910a that saw the initial SYN packet 930. This gateway 910a finds a match for the ACK packet in its local state table 960 indicating that VM-B is handling, and sends the packet to VM-B. If the gateway 910a would have not found a match in its local state table 960, the consistent hash operation would have selected VM-C (based on the ACK packet's hash value of 1923, the next-higher value is now 2044 which maps the packet to VM-C).

A computer storage device can be encoded with a computer program. The program can include instructions that when executed by data processing apparatus cause the data processing apparatus to perform operations. The operations can include obtaining health information of virtual machines that communicate via a virtual network, the virtual machines being configured to handle requests associated with at least a destination address on a public network; determining, based on the health information of the virtual machines, a group of healthy virtual machines comprising two or more of the virtual machines; receiving, from the public network, an incoming packet that includes a source address and the destination address; selecting a handling virtual machine of the group of healthy virtual machines based on an output of a consistent mapping operation given the source address, the destination address, and the group of healthy virtual machines, the consistent mapping operation being configured for load-balancing among the virtual machines; forwarding the incoming packet to the handling virtual machine via the virtual network; and creating a data structure entry that reflects a mapping between the source address and the handling virtual machine to forward one or more additional incoming packets, each including the source address and the destination address, to the handling virtual machine.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
executing virtual machines that are each configured to communicate with each other over a virtual network and are configured to handle requests associated with at least a destination address on a public network;
operating gateways, including a first gateway and a separate and distinct second gateway, that are each configured to provide connectivity between the virtual network and the public network, that each separately and independently implement a consistent mapping operation to perform load-balancing among the virtual machines, wherein at the first gateway a first mapping data structure includes entries reflecting mappings between source addresses and virtual machines, and wherein at the second gateway a distinct second mapping data structure includes entries reflecting mappings between source addresses and virtual machines;
independently obtaining health information of the virtual machines, by each of the first gateway and the second gateway;
independently determining, based on the health information of the virtual machines, a group of healthy virtual machines comprising two or more of the virtual machines, by each of the first gateway and the second gateway;
receiving, at the first gateway, a first incoming packet that includes a source address and the destination address, wherein the first mapping data structure does not include, at a time of receiving the first incoming packet, any entry that reflects a mapping between the source address and any of the virtual machines;
selecting, at the first gateway, a handling virtual machine from among the group of healthy virtual machines that was independently determined by the first gateway, based on an output of the consistent mapping operation that is separately and independently implemented by the first gateway, wherein the output is obtained given the source address, the destination address, and the group of healthy virtual machines that was independently determined by the first gateway;
forwarding, by the first gateway, the first incoming packet to the handling virtual machine over the virtual network;
creating, in the first mapping data structure at the first gateway, a first mapping entry reflecting a mapping between the source address and the handling virtual machine to forward one or more additional incoming packets, each including the source address and the destination address, to the handling virtual machine;
receiving at the second gateway, a second incoming packet that includes the same source address and the same destination address as the first incoming packet, wherein the second mapping data structure does not include, at a time of receiving the second incoming packet, any entry that reflects a mapping between the source address and any of the virtual machines, and the first mapping data structure does include the first mapping entry;
selecting, solely by operation of the second gateway independent of the first gateway and of the first mapping data structure, the same handling virtual machine from among the group of healthy virtual machines that was independently determined by the second gateway, based on an output of the consistent mapping operation that is separately and independently implemented by the second gateway, wherein the output is obtained given the source address, the destination address, and the group of healthy virtual machines that was independently determined by the second gateway;
forwarding, by the second gateway, the second incoming packet to the handling virtual machine over the virtual network; and
creating, in the second mapping data structure at the second gateway, a second mapping entry reflecting a mapping between the source address and the handling virtual machine to forward one or more additional incoming packets, each including the source address and the destination address, to the handling virtual machine.

2. The method of claim 1, wherein the virtual network is for Internet Protocol (IP) based communications, wherein each gateway has an IP address on the public network and a different IP address on the virtual network, and wherein operating the gateways comprises using separate IP tunnels to effect delivery of IP packets on the virtual network to the virtual machines.

3. The method of claim 1, wherein forwarding the first incoming packet to the handling virtual machine comprises sending the first incoming packet to the handling virtual machine without changing the destination address, wherein the handling virtual machine includes a network interface that is configured to receive packets that are addressed to the destination address.

4. The method of claim 1, wherein forwarding the first incoming packet to the handling virtual machine comprises performing a network address translation on the first incoming packet where the destination address of the first incoming packet is replaced with a network address of the handling virtual machine, the network address being private to the virtual network.

5. The method of claim 1, wherein selecting, at the first gateway, the handling virtual machine is further based on a geographical proximity of a virtual machine to a geographical location associated with an origin of the first incoming packet.

6. The method of claim 1, wherein selecting, at the first gateway, the handling virtual machine comprising:

generating a flow identifier based on the source address, the destination address, a source port of the first incoming packet, and a destination port of the first incoming packet;

using the flow identifier as input to a hash function to produce a hash value; and selecting a virtual machine based on the hash value.

7. The method of claim 1, wherein obtaining the health information comprises:

sending packets to check respective virtual machines; and receiving one or more responses to the sent packets.

8. The method of claim 1, wherein at least one of the gateways is configured to encapsulate the received incoming packets from the public network when sending to the virtual machines, and to de-encapsulate received packets from the virtual machines when sending to the public network.

9. A system comprising:

one or more data processing apparatus; and one or more memory apparatus in data communication with the data processing apparatus and storing instructions executable by the data processing apparatus and that upon such execution cause the data processing apparatus to perform operations comprising:

executing virtual machines that are each configured to communicate with each other over a virtual network and are configured to handle requests associated with at least a destination address on a public network;

operating gateways, including a first gateway and a separate and distinct second gateway, that are each configured to provide connectivity between the virtual network and the public network, that each separately and independently implement a consistent mapping operation to perform load-balancing among the virtual machines, wherein at the first gateway a first mapping data structure includes entries reflecting mappings between source addresses and virtual machines, and wherein at the second gateway a distinct second mapping data structure includes entries reflecting mappings between source addresses and virtual machines;

independently obtaining health information of the virtual machines, by each of the first gateway and the second gateway;

independently determining, based on the health information of the virtual machines, a group of healthy virtual machines comprising two or more of the virtual machines, by each of the first gateway and the second gateway;

receiving, at the first gateway, a first incoming packet that includes a source address and the destination address, wherein the first mapping data structure does not include, at a time of receiving the first incoming packet, any entry that reflects a mapping between the source address and any of the virtual machines;

selecting, at the first gateway, a handling virtual machine from among the group of healthy virtual machines that was independently determined by the first gateway, based on an output of the consistent mapping operation that is separately and independently implemented by the first gateway, wherein the output is obtained given the source address, the destination address, and the group of healthy virtual machines that was independently determined by the first gateway;

forwarding, by the first gateway, the first incoming packet to the handling virtual machine over the virtual network;

creating, in the first mapping data structure at the first gateway, a first mapping entry reflecting a mapping between the source address and the handling virtual machine to forward one or more additional incoming packets, each including the source address and the destination address, to the handling virtual machine;

receiving at the second gateway, a second incoming packet that includes the same source address and the same destination address as the first incoming packet, wherein the second mapping data structure does not include, at a time of receiving the second incoming packet, any entry that reflects a mapping between the source address and any of the virtual machines, and the first mapping data structure does include the first mapping entry;

selecting, solely by operation of the second gateway independent of the first gateway and of the first mapping data structure, the same handling virtual machine from among the group of healthy virtual machines that was independently determined by the second gateway, based on an output of the consistent mapping operation that is separately and independently implemented by the second gateway, wherein the output is obtained given the source address, the destination address, and the group of healthy virtual machines that was independently determined by the second gateway;

forwarding, by the second gateway, the second incoming packet to the handling virtual machine over the virtual network; and creating, in the second mapping data structure at the second gateway, a second mapping entry reflecting a mapping between the source address and the handling virtual machine to forward one or more additional incoming packets, each including the source address and the destination address, to the handling virtual machine.

10. The system of claim 9, wherein the virtual network is for Internet Protocol (IP) based communications, wherein each gateway has an IP address on the public network and a different IP address on the virtual network, and wherein operating the gateways comprises using separate IP tunnels to effect delivery of IP packets on the virtual network to the virtual machines.

11. The system of claim 9, wherein forwarding the first incoming packet to the handling virtual machine comprises sending the first incoming packet to the handling virtual machine without changing the destination address, wherein the handling virtual machine includes a network interface that is configured to receive packets that are addressed to the destination address.

12. The system of claim 9, wherein forwarding the first incoming packet to the handling virtual machine comprises performing a network address translation on the first incoming packet where the destination address of the first incoming packet is replaced with a network address of the handling virtual machine, the network address being private to the virtual network.

13. The system of claim 9, wherein selecting, at the first gateway, the handling virtual machine is further based on a geographical proximity of a virtual machine to a geographical location associated with an origin of the first incoming packet.

14. The system of claim 9, wherein selecting, at the first gateway, the handling virtual machine comprising:

generating a flow identifier based on the source address, the destination address, a source port of the first incoming packet, and a destination port of the first incoming packet;

using the flow identifier as input to a hash function to produce a hash value; and selecting a virtual machine based on the hash value.

15. The system of claim 9, wherein obtaining the health information comprises:
    sending packets to check respective virtual machines; and
    receiving one or more responses to the sent packets.

16. The system of claim 9, wherein at least one of the gateways is configured to encapsulate the received incoming packets from the public network when sending to the virtual machines, and to de-encapsulate received packets from the virtual machines when sending to the public network.

\* \* \* \* \*